United States Patent [19]

Kulczyk et al.

[11] Patent Number: 5,044,769
[45] Date of Patent: Sep. 3, 1991

[54] TEMPERATURE SENSORS

[75] Inventors: Konrad Kulczyk, Hertfordshire; George W. Smith, London, both of England

[73] Assignee: Schlumberger Industries Limited, Farnborough, England

[21] Appl. No.: 462,372

[22] Filed: Jan. 9, 1990

[30] Foreign Application Priority Data

Jan. 14, 1989 [GB] United Kingdom ............ 8900815
Jun. 29, 1989 [GB] United Kingdom ............ 8914929

[51] Int. Cl.$^5$ .................. G01K 11/22; G01K 11/24; G01K 1/14
[52] U.S. Cl. ................. 374/119; 374/117; 374/137; 374/208; 248/74.4
[58] Field of Search ........... 374/117, 208, 119, 137; 248/74.4, 68.1, 74.1, 63; 73/644, 642, 1 DV

[56] References Cited

U.S. PATENT DOCUMENTS

| | | | |
|---|---|---|---|
| 3,214,976 | 11/1965 | Miller, Jr. ............... | 374/117 |
| 3,540,279 | 11/1970 | Fam ...................... | 374/119 |
| 3,636,754 | 1/1972 | Lynnworth et al. ....... | 73/632 |
| 4,020,531 | 5/1977 | Ahrens et al. ........... | 248/74.4 |
| 4,020,692 | 5/1977 | Arave .................... | 374/119 |
| 4,102,195 | 7/1978 | Thompson et al. ....... | 374/117 |
| 4,483,630 | 11/1984 | Varela ................... | 374/117 |
| 4,650,346 | 3/1987 | Tehon .................... | 374/117 |
| 4,654,612 | 3/1987 | Smith .................... | 248/74.1 |
| 4,762,425 | 8/1988 | Shakkottai et al. ...... | 374/117 |
| 4,921,191 | 5/1990 | Herschler et al. ....... | 248/74.4 |

FOREIGN PATENT DOCUMENTS 0160032 10/1982 Japan ................... 374/117
2200426 8/1988 United Kingdom .
2219857 12/1989 United Kingdom .

Primary Examiner—William A. Cuchlinski, Jr.
Assistant Examiner—Diego F. F. Gutierrez
Attorney, Agent, or Firm—Sanford J. Asman

[57] ABSTRACT

An ultrasonic distributed temperature sensor comprises an elongate ultrasonic waveguide in the form of steel or nickel wire 0.16 cm in diameter and up to 10 meters long, which is strung around the area whose temperature is to be monitored, eg an aircraft engine. The wire is provided with discontinuities in the form of annuli welded on to it to form annular flanges, which serve to partially reflect ultrasonic pules launched into one end of the wire. These flanges, known as "posi-notches", divide the waveguide, and thus the area to be monitored, into a number of zones, the size of each zone being determined by the spacing of the adjacent flanges defining it. In operation, the temporal spacing of each pair of successive partially reflected pulses is a measure of the average temperature of the zone defined by the flanges producing that pair of pulses. In order to mount the waveguide in the area to be monitored, it is held by locating devices which engage the radial surfaces of some of the flanges, so locating the waveguide longitudinally, and by annular clamping devices which lightly grip the wire without introducing undesired stresses. In one embodiment, the locating devices and the mounting devices are basically very similar, and comprise an annular member having a bore containing at least three axially extending resilient strips which make line contact with the waveguide to support it.

16 Claims, 2 Drawing Sheets

TEMPERATURE SENSORS

This invention relates to temperature sensors, and is more particularly but not exclusively concerned with ultrasonic distributed temperature sensors for use in aircraft.

There are several areas in modern aircraft where it is desirable to measure the temperature distribution over the area, for example within an engine housing or within an avionics bay, so that overheating in part of the area can be detected early enough for appropriate remedial action to be taken. In this way, fires and other potential catastrophic failures can be avoided.

One known form of distributed temperature sensor is described in U.S. Pat. No. 3 636 754, and comprises an elongate ultrasonic waveguide which is intended to be strung out around the area to be monitored. The waveguide is provided with a number of longitudinally distributed reflecting means, e.g., notches, which divide it into zones defining corresponding zones of the area whose temperature is to be monitored. Ultrasonic pulses launched into one end of the waveguide are partially reflected at each reflecting means to form echo pulses, and the respective time intervals between the receipt of successive echo pulses resulting from a given launched pulse are measured in a counter/timer. Since the propagation speed of the ultrasonic pulses in the waveguide is a function of the temperature of the waveguide, the time interval between two successive echo pulses resulting from a given launched pulse is a measure of the average temperature of the zone defined by the two successive reflecting means which gave rise to those echo pulses.

Although this known form of distributed temperature sensor works well in some environments, it is difficult to use in an aircraft environment. Thus use of the sensor in an aircraft environment requires that the sensor be mounted so as to be able to withstand fairly harsh vibration and shock-loading conditions, without moving longitudinally (since that would change the correspondence between the zones of the sensor and the zones of the area being monitored). However, radially gripping the waveguide tightly to prevent longitudinal movement produces local radial stresses in the waveguide, and these stresses can produce spurious echo pulses, i.e., echo pulses which are difficult to distinguish from the true echo pulses from the reflecting means.

It is an object of the present invention to alleviate this difficulty.

According to one aspect of the present invention, there is provided a temperature sensor comprising an elongate ultrasonic waveguide having distributed along its length a plurality of means for partially reflecting ultrasonic pulses launched into one end of the waveguide, and means for mounting the waveguide such that it extends through an area whose temperature is to be monitored, wherein at least some of the reflecting means comprise outwardly projecting portions of the waveguide each having a pair of opposed surfaces extending substantially perpendicular to the longitudinal axis of the waveguide, and the mounting means includes at least one locating means for engaging the opposed surfaces of at least one of these portions so as to substantially prevent longitudinal movement of the parts of waveguide adjacent said at least one portion.

Thus in the temperature sensor of the present invention, the locating means, by locating the outwardly projecting portion in the specified manner, not only accurately positions and locates the adjacent parts of the waveguide longitudinally, but also substantially avoids the introduction into the waveguide of radial stresses which could give rise to spurious reflected pulses. Furthermore, since the or each locating means is arranged at a respective one of the reflecting means constituted by the outwardly projecting portions, any slight radial stress created thereby would merely have the effect of slightly changing the amplitude of the reflected pulse which is already being produced by the reflecting means.

The sensor may include a plurality of such locating means, each of which may have surfaces made from PTFE, silicon rubber or fluorosilicon rubber for engaging the opposed surfaces of the projecting portions, while the mounting means may further include a plurality of annular support devices which coaxially surround the waveguide between successive reflecting means, and each of which is adapted to laterally locate the waveguide without gripping it tightly. Each such support device preferably has an internal support surface (i.e., the surface which contacts the waveguide) made from a resilient material, which may be silicon rubber or fluorosilicon rubber, and which may advantageously have one or more layers of a fine woven metal mesh, e.g., that available under the trade mark KNITMESH, therein.

Alternatively and preferably, the mounting means may comprise a plurality of mounting devices each of which also serves as a respective locating means. In this case, each mounting device may comprise an annular device which, in use, coaxially surrounds the waveguide and which has a bore containing a circumferentially extending groove for receiving a respective reflecting means, said bore further containing, on each side of said groove, at least three (and preferably four) circumferentially distributed axially extending strips of resilient material, preferably of circular cross-section and preferably of silicon rubber or fluorosilicon rubber, positioned therein so as to make line contact with, and thereby radially support, the waveguide, the ends of the strips adjacent said groove advantageously projecting thereinto into abutment with said reflecting means, whereby to axially locate the waveguide. Conveniently, each strip is mounted in a respective groove extending axially of the bore. Thus each strip may be a push fit in, and/or bonded into, its respective groove. Each mounting device is advantageously moulded in a thermoplastics material, preferably in two pieces which mate in a plane or planes extending radially thereof and which can be assembled together around the waveguide.

In a preferred embodiment of the invention, each outwardly projecting portion extends around the entire circumference of the waveguide as a flange. Thus each flange may comprise an annular member which is brazed, preferably vacuum brazed, or welded to the outside surface of the waveguide. To facilitate this, the waveguide is conveniently circular in cross-section. Additionally, the flanges preferably progressively increase in size with increasing distance from said one end of the waveguide, so as to tend to reduce the differences between the respective amplitudes of the reflected pulses arriving back at said one end in response to a given launched pulse .

The invention also includes a temperature sensing system incorporating a temperature sensor in accordance with any of the preceding statements of invention, and further comprising means for launching ultrasonic pulses, for example longitudinal pulses, into one end of the waveguide, means for detecting reflected ultrasonic pulses due to said reflecting means, and means for measuring the respective time intervals between successive ones of said reflected pulses.

According to another aspect of the invention, there is provided a mounting device for an ultrasonic waveguide, the device comprising an annular device which, in use, coaxially surrounds the waveguide and which has a bore containing at least three circumferentially distributed axially extending strips of resilient material positioned therein so as to make line contact with, and thereby radially support, the waveguide.

Where the mounting device is to be used with a waveguide provided with at least one outwardly projecting portion having a pair of opposed surfaces extending substantially perpendicular to the longitudinal axis of the waveguide, the bore of the annular device may be provided with a circumferentially extending groove for receiving said outwardly projecting portion, said strips may be provided separately on each side of said circumferentially extending groove, and the end of the strips adjacent said circumferentially extending groove may project thereinto into abutment with said outwardly projecting portion, whereby to axially locate the waveguide.

The invention will now be described, by way of example only, with reference to the accompanying drawings, of which:

Figure 1:
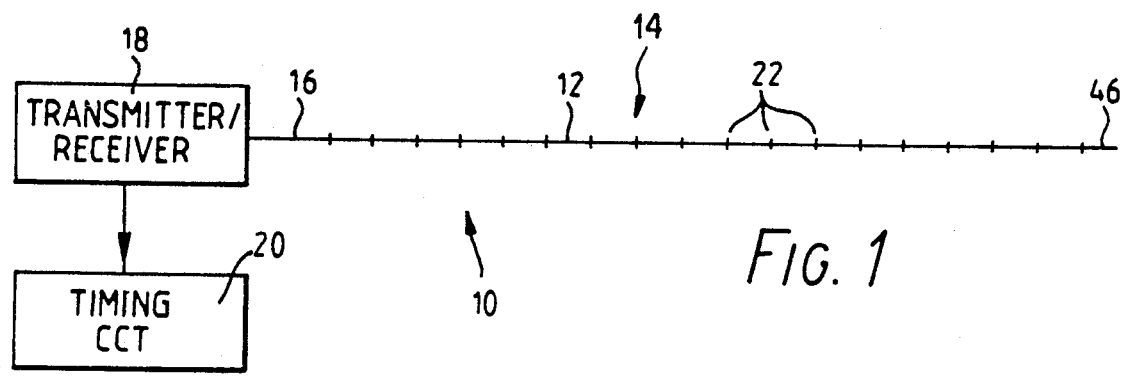
FIG. 1 is a much simplified schematic drawing of a first embodiment of a distributed temperature sensor and system in accordance with the invention.
Figure 2:
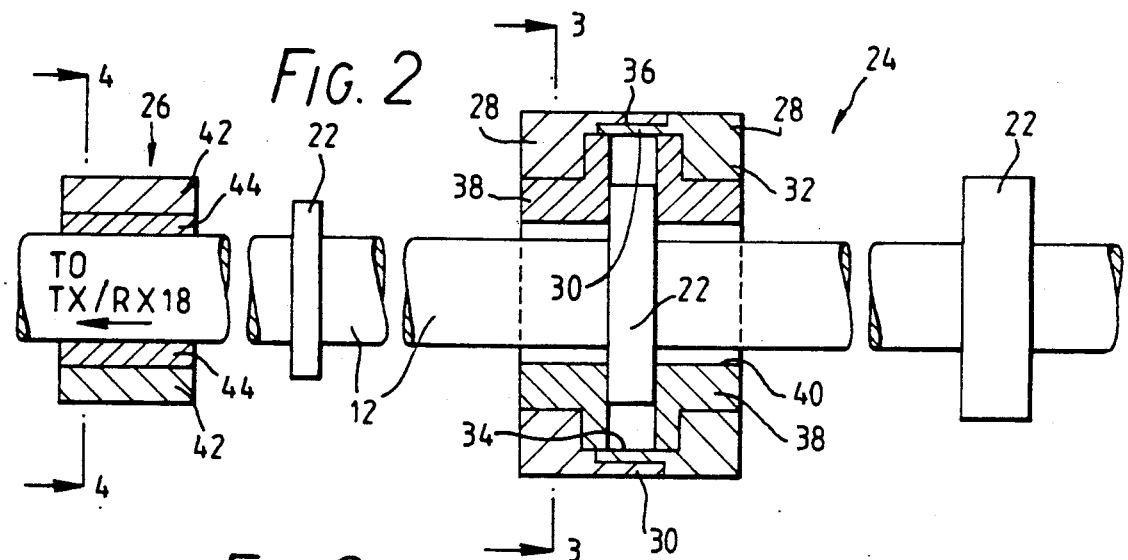
FIG. 2 is a more detailed and enlarged sectional view, still somewhat schematic, of part of the sensor of FIG. 1.
Figure 3:
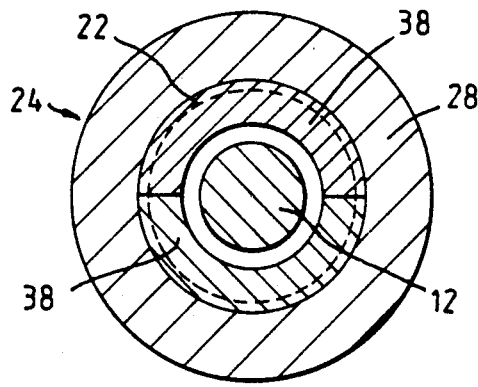
Figure 4:
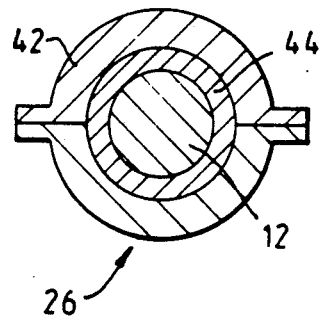
Figure 5:
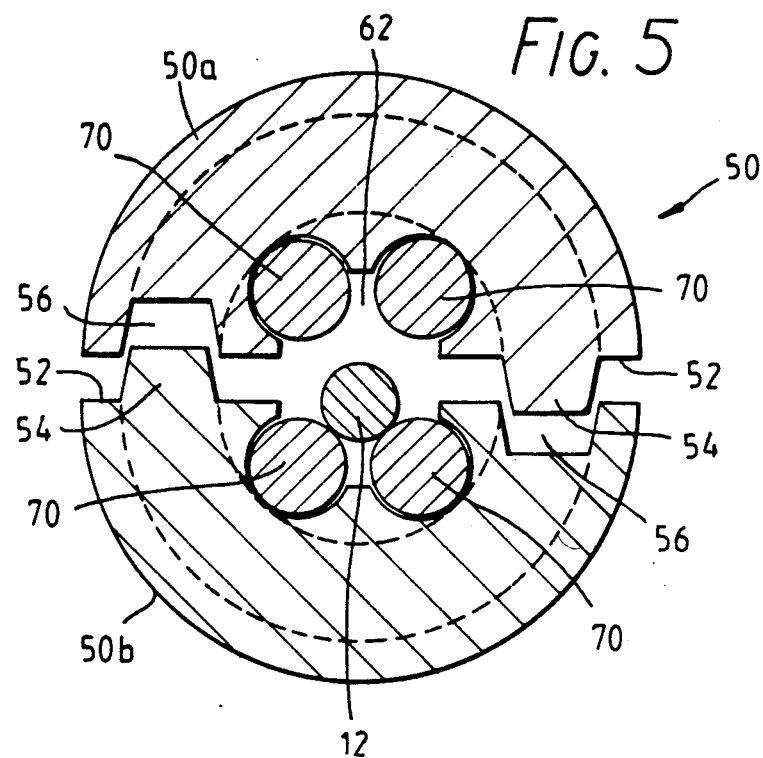
Figure 6:
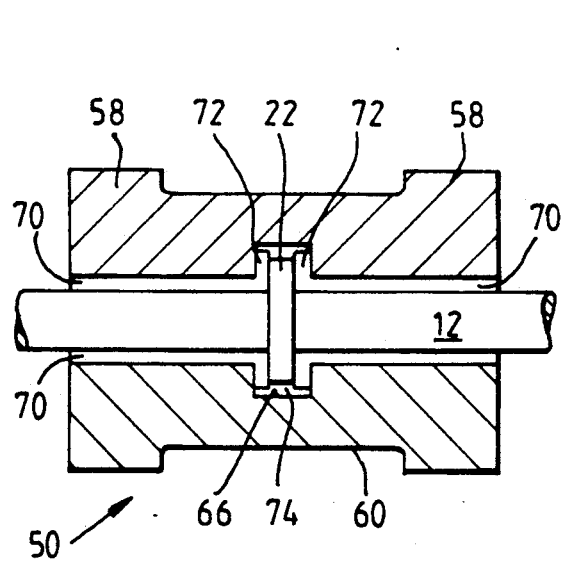

FIGS. 3 and 4 are sectional views on the lines 3—3 and 4—4 respectively of FIG. 2;

FIG. 5 is a partly exploded sectional view of an alternative form of mounting fixture for use as part of the sensor of FIG. 1;

FIG. 6 is another sectional view of the mounting fixture of FIG. 5; and

Figure 7:
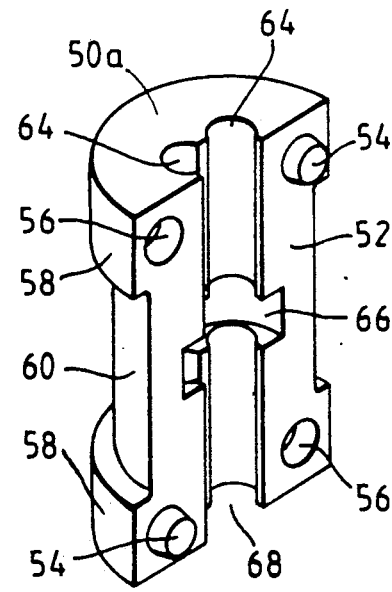

FIG. 7 is a perspective view of one half of the mounting fixture of FIG. 5.

The distributed temperature sensor of FIG. 1 is indicated generally at 10, and comprises an elongate ultrasonic waveguide 12 in the form of a cylindrical rod or wire 14 of nickel, or a nickel-based alloy such as INCONEL or NICHROME, or annealed stainless steel. The waveguide 12 is typically between 3 and 10 meters long, and is divided into a plurality of zones, typically each about 5 to 100 cm long, as will hereinafter become apparent: the lengths of the zones need not be the same, but can be tailored to the area whose temperature is to be monitored (e.g., with several short zones in critical parts of the area, and fewer, longer, zones in less critical parts of the area.)

Coupled to one end 16 of the waveguide 12 is an ultrasonic pulse transmitter and receiver 18, typically comprising a magnetostrictive device which launches longitudinal ultrasonic pulses (also referred to as compressional or expansional pulses) into the waveguide 12. The transmitter/receiver 18 is also coupled to a timing circuit 20, which is arranged to measure the time interval between each pulse launched into the waveguide 12 and any reflected pulses resulting from that pulse.

Part of the waveguide 12 is shown in more detail in FIG. 2, where it can be seen that the wire or rod 14 is divided into the aforementioned zones by equally longitudinally-spaced annular flanges 22, which project radially from the waveguide 12. Each flange 22 is constituted by an annular washer which is made of the same material as the waveguide 12, and which is either vacuum brazed to the outside of the waveguide 12 using a brazing material whose melting point is higher than the highest temperature that the sensor 10 is intended to be able to withstand, or, for fire detection applications, welded thereto, e.g., by electron beam welding.

In use, the waveguide 12 is typically strung around an area whose temperature is to be monitored, for example around the outside of an aircraft gas turbine engine, within the engine housing or nacelle, the waveguide being sufficiently flexible to permit this. As mentioned hereinbefore, great care must be taken with mounting the waveguide 12 to ensure that the mounting fixtures used do not introduce unwanted variations in the acoustic impedance of the waveguide. To this end, two different kinds of mounting fixture are used, as indicated at 24 and 26 in FIGS. 2 to 4.

The mounting fixture 24 (FIGS. 2 and 3) comprises two generally cup-shaped annular members 28 which coaxially surround the waveguide 12 and are disposed one on each side of one of the flanges 22, and one of which is fixedly secured to a convenient fixed point in the area whose temperature is to be monitored. Each of the members 28 has an axially extending portion 30 and a radially inwardly extending portion 32, the portions 32 defining respective apertures 34 which are greater in diameter than the flange 22.

The portions 30 have co-operating screw threads 36 at their respective open ends, whereby they can be screwed together to lightly press two diametrically split bushes 38 of PTFE into engagement with the radially extending surfaces of the flange 22. The bushes 38 are shaped to fit snugly within their respective ones of the members 28, and have respective apertures 40 which coaxially surround the main body of the waveguide 12 with clearance. Thus as the members 28 are screwed together, the bushes lightly grip the flange 22 with a gripping force directed axially of (i.e., parallel to the longitudinal axis of) the waveguide 12, but do not press against the main body of the waveguide 12. This prevents longitudinal movement of the waveguide 12, so accurately locating it longitudinally with respect to the area whose temperature is to be monitored, while not applying forces thereto likely to result in radial stresses in the main body of the waveguide 12.

In practice, the frictional engagement between the bushes 38 and the flanges 22 holds the waveguide 12 fairly securely against radial (i.e., transverse) movement as well. However, since the mounting fixture 24 is normally used at only a few selected ones of the flanges 22, further lateral support for the waveguide 12 is provided by the mounting fixtures 26.

The mounting fixture 26 comprises a pair of half-cylindrical clamping shells 42, one of which is again fixedly secured by any convenient means (not shown) to a fixed point in the area whose temperature is to be monitored. The clamping shells 42 have a lining 44 made of fluorosilicon rubber, and clamp together so as to coaxially surround the waveguide 12 and lightly compress the lining 44. Thus the mounting fixture 26 provides good lateral support for the waveguide 12 without applying forces thereto which would result in radial stresses in the main body of the waveguide. It does not provide good longitudinal location, but that does not matter since longitudinal location is provided by the mounting fixtures 24 as already described.

FIGS. 5 to 7 show an alternative mounting fixture, generally indicated at 50, which can replace both of the mounting fixtures 24 and 26. The mounting fixture 50 is substantially cylindrical, and is moulded in two identical halves 50a and 50b from a high temperature thermoplastics material, for example the material available from Morgan Matroc Ltd of Sandy, Bedfordshire, England under the name Micatherm HT. The two halves 50a and 50b have diametrically extending mating surfaces 52, which are provided with complementarily shaped spigots 54 and recesses 56 to locate and lock them precisely with respect to each other as they are secured together. The external cylindrical surface of the mounting fixture 50 is provided with radially outwardly projecting flanges 58 at its two ends, the recessed region 60 defined between these flanges serving to receive and locate a typical C-clamp by which the mounting fixture 50 is secured to some convenient point in the area whose temperature is being monitored.

The mounting fixture 50 contains an axially extending central bore 62, having four equiangularly distributed circular section grooves 64 extending axially along its wall. These grooves 64 intersect a circumferential groove 66, which extends completely round the bore 62 midway between the two ends of the bore, and which effectively cuts each groove 64 into two axially separated halves. The section of each of the grooves 64 comprises just over half the circumference of a circle, so that the mouth 68 of each groove is very slightly narrower than the maximum width of the groove.

Each axial half of each groove 64 contains a respective circular-section strip 70 of fluorosilicon rubber, which is of substantially the same diameter as its groove. Each strip 70 is therefore a snap-fit in its groove 64, and is bonded therein using a silicon or other high temperature resistant adhesive. The end 72 of each strip 70 near the circumferential groove 66 extends slightly into that groove, so as to define with the end 72 of the strip 70 in the other half of the same groove 64 (i.e., on the other side of the groove 66) a small gap 74.

In use, the two halves 50a and 50b of the mounting fixture 50 are assembled together around the waveguide 12 at one of the flanges 22, so that the flange is received within the circumferential groove 66 and located in the small gaps 74 defined between the ends 72 of the two strips 70 in the two halves of each groove 64, i.e., these ends 72 abut the opposite sides of the flange. Further, the respective diameters of the bore 62 and of the strips 70 are carefully selected, in relation to the diameter of the waveguide 12, to ensure that each strip 70 makes light line contact with the waveguide, without significantly compressing the strips 70. As a result, the strips 70 serve to radially (or laterally) locate the waveguide 12 without applying significant compressive forces to it, while the abutment of the ends 72 of the strips 70 with the flange 22 within the circumferential groove 66 axially locates the waveguide 12, again without applying significant loads to it. Additionally, the rubber strips 70 are loaded only in compression, even under vibration conditions, so that shear loading of the strips, which is extremely undesirable, is avoided.

In practice, a plurality of the mounting fixtures 50 are distributed along the waveguide 12, say one at each third or fourth flange 22. However, some can be mounted between flanges 22 if desired, although in that position, they will not provide the aforementioned axial location of the waveguide.

The materials chosen for the mounting fixture 50, i.e., the high temperature thermoplastics material and the fluorosilicon rubber, are selected to ensure that the fixture can survive a standard aircraft fire test. For less rigorous applications, other materials can be used, e.g., silicon or other synthetic rubber for the strips 70.

To monitor the temperature, ultrasonic pulses are periodically launched into the end 16 of the waveguide 12 by the transmitter/receiver 18, typically at a frequency of 100 Hz. Each pulse so launched is partially reflected at each of the flanges 22 to form a respective echo pulse, so that a succession of these echo pulses is received back at the transmitter/receiver 18, one from each flange.

The propagation speed of the ultrasonic pulses in the waveguide 12 is typically about 5000 m/sec, but as already mentioned, it varies with temperature. Thus the time interval between the receipt of any two successive echo pulses at the transmitter/receiver 18 is a function of the average temperature of the waveguide 12 between the two successive flanges 22 which produced those two echo pulses, and therefore an indication of the average temperature of the zone of the area whose temperature is being monitored defined by those two flanges. The respective time intervals between each pair of successive echo pulses is therefore measured by the timing circuit 20.

In addition to the echo pulses produced by the flanges 22, a later and significantly larger echo pulse is reflected from the far end 46 of the waveguide 12 (i.e., the end remote from the end 16). The detection of this larger end-reflected pulse serves as a useful check that the waveguide is unbroken and transmitting pulses satisfactorily. More importantly, the time of its arrival gives an indication of the average temperature of the waveguide 12 as a whole, which is used by a microprocessor within the transmitter/receiver 18 to adjust the temporal position, with respect to each launched pulse, of a plurality of successive time "gates" or "windows" within which each of the successive echo pulses from the flanges 22 ought to occur. This can enable spurious pulses due to external interference to be discriminated from true echo pulses, and so improve the reliability of the system.

The amplitude of each echo pulse received back at the transmitter/receiver 18 from a given flange 22 is a function of the amplitude of the ultrasonic pulse arriving at that flange, the physical size (diameter, thickness) of the flange, and to a lesser extent, the distance of the flange from the transmitter/receiver. So since each flange 22 typically reflects about 1% to 4% of the ultrasonic energy arriving at it, each successive flange in the direction of propagation of the pulses launched by the transmitter/receiver 18 has less energy to reflect than the preceding one, so that successive echo pulses get progressively smaller in amplitude. However, in order to simplify the detection and processing of the echo pulses in the transmitter/receiver 18, it is desirable that they be of approximately similar amplitude. So to achieve this, each successive flange 22 in the direction of propagation of the pulses launched by the transmitter/receiver 18 is slightly larger than the preceding one, as shown in greatly exaggerated form in FIG. 2: the calculation of the relative sizes of the flanges 22 to produce this result is a relatively simple matter. A similar result can be achieved, or the result can be assisted, by including a variable gain amplifier whose gain is increased slightly for each successive echo pulse within the input of the receiver section of the transmitter/receiver 18.

Many modifications can be made to the described embodiment of the invention. In particular, the lining 44 in the mounting fixture 26 can have one or more layers of fine woven metal mesh, such as that available under the trade mark KNITMESH, bonded therein, so as to maintain the integrity of their function for a certain minimum period of time even when the rubber is degraded by high temperature, e.g., due to fire.

Also to facilitate assembly and maintenance, the waveguide 12 can be connected to the transmitter/receiver 18 by means of an ultrasonic waveguide connector of the kind described in our co-pending United Kingdom Patent Application No. 8814246, entitled "Ultrasonic Waveguide Connector" and filed on June 15, 1988.

Additionally, suitable materials other than those specifically cited can be used to make the waveguide 12, and shapes other than cylindrical, e.g., rectangular-section or flat ribbon shapes, can also be used. Further, for some shapes of waveguide, ultrasonic pulses other than longitudinal pulses can be used, for example torsional pulses, and the pulses can in some cases be produced by a piezoelectric device rather than a magnetostrictive device.

We claim:

1. A temperature sensor comprising an elongate ultrasonic waveguide having distributed along its length a plurality of means for partially reflecting ultrasonic pulses launched into one end of the waveguide by an ultrasonic pulse transmitting and receiving means coupled to said one end of said waveguide, and means for mounting the waveguide such that it extends through an area whose temperature is to be monitored, wherein at least some of the reflecting means comprise outwardly projecting portions of the waveguide each having a pair of opposed surfaces extending substantially perpendicular to the longitudinal axis of the waveguide, and the mounting means includes at least one locating means for engaging the opposed surfaces of at least one of these portions so as to substantially prevent longitudinal movement of the parts of the waveguide adjacent said at least one portion.

2. A temperature sensor as claimed in claim 1, wherein the surfaces of the locating means which engage the opposed surfaces of the projecting portion or portions are made from a material selected from the group of materials comprising PTFE, silicon rubber and fluorosilicon rubber.

3. A temperature sensor as claimed in claim 1, wherein the mounting means further includes at least one annular support device which coaxially surrounds the waveguide, and which is adapted to laterally locate the waveguide without gripping it tightly.

4. A temperature sensor as claimed in claim 3, wherein the support device has an internal support surface made from a resilient material.

5. A temperature sensor as claimed in claim 4, wherein said material is selected from the group of materials comprising silicon rubber and fluorosilicon rubber.

6. A temperature sensor as claimed in claim 1, wherein the mounting means comprises a plurality of mounting devices, each of which also serves as a respective locating means.

7. A temperature sensor as claimed in claim 6, wherein each mounting device comprises an annular device which, in use, coaxially surrounds the waveguide and which has a bore containing a circumferentially extending groove for receiving a respective reflecting means, said bore further containing, on each side of said groove, at least three circumferentially distributed axially extending strips of resilient material positioned therein so as to make line contact with, and thereby radially support, the waveguide.

8. A temperature sensor as claimed in claim 7, wherein the ends of the strips adjacent said groove project thereinto into abutment with said reflecting means, whereby to axially locate the waveguide.

9. A temperature sensor as claimed in claim 7, wherein there are four such strips, equiangularly distributed around the bore.

10. A temperature sensor as claimed in claim 7, wherein each strip is of circular cross-section.

11. A temperature sensor as claimed in claim 7, wherein each strip is mounted in a respective groove extending axially of the bore, and is either a push fit in, or bonded into, its groove.

12. A temperature sensor as claimed in claim 7, wherein each annular device is made in two pieces which mate in a plane or planes extending radially thereof and which can be assembled together around the waveguide.

13. A temperature sensor as claimed in claim 1, wherein each outwardly projecting portion extends around the entire circumference of the waveguide as a flange.

14. A temperature sensor as claimed in claim 13, wherein each flange comprises an annular member which is brazed to the outside surface of the waveguide.

15. A temperature sensor as claimed in claim 13, wherein the flanges progressively increase in size with increasing distance from said one end of the waveguide, so as to tend to reduce the differences between the respective amplitudes of the reflected pulses arriving back at said one end in response to a given launched pulse.

16. A temperature sensor as claimed in claim 1, wherein said ultrasonic pulse transmitting and receiving means comprises means for launching ultrasonic pulses into one end of the waveguide and means for detecting reflected ultrasonic pulses due to said reflecting means, and said temperature sensor further comprising means for measuring the respective time intervals between successive ones of said reflected pulses.

* * * * *